United States Patent [19]
Penco et al.

[11] Patent Number: 4,594,721
[45] Date of Patent: Jun. 10, 1986

[54] CORONA DISCHARGE PREIONIZED HIGH PULSE REPETITION FREQUENCY LASER

[75] Inventors: Eugenio Penco; Gianemilio Salvetti, both of Rome, Italy

[73] Assignees: Enea-Comitato Nazionale per la Ricerca e lo Sviluppo dell'Energia Nucleare e dell'Energie Alternative; Selenia - Industrie Elettroniche Associate S.p.A., both of Rome, Italy

[21] Appl. No.: 687,030

[22] Filed: Dec. 28, 1984

[30] Foreign Application Priority Data

Dec. 29, 1983 [IT] Italy ............................... 49601 A/83

[51] Int. Cl.$^4$ ............................................. H01S 3/097
[52] U.S. Cl. ......................................... 372/88; 372/85; 372/86; 313/631; 313/601; 315/111.81
[58] Field of Search ........................ 372/87, 85, 86, 92, 372/61, 83

[56] References Cited
U.S. PATENT DOCUMENTS 4,510,608  4/1985  Fujii et al. ............................. 372/87
4,546,482 10/1985  Bagaglia et al. ........................ 372/87

Primary Examiner—Léon Scott, Jr.
Attorney, Agent, or Firm—Stevens, Davis, Miller & Mosher

[57] ABSTRACT

A sealed structure laser apparatus is disclosed which utilizes corona discharge as a pre-ionizing means wherein the laser discharge space is defined by a dielectric material channel with C cross section and one of the two discharge main electrodes is located along the inner wall of the C channel opposite the C aperture while the other electrode confronts said aperture from the outside of the channel the latter being enveloped by a conducting material grid, two opposite slits being defined between the two edges of said C channel gap and a dielectric material wall located in front of said gap. The exhausted mixture is recycled through an eccentric space defined between two cylindrical walls with parallel axes, the narrower section of said space being partially intercepted by the side walls of said C channel and by said dielectric wall whereby the gaseous mixture is compelled to flow through said slits to enter the laser space and leave the same, the larger section of the eccentric space being utilized for receiving the propelling and reconditioning means of the gaseous mixture, such as fans, coolers etc.

6 Claims, 2 Drawing Figures

CORONA DISCHARGE PREIONIZED HIGH PULSE REPETITION FREQUENCY LASER

The present invention relates to a TEA laser apparatus with corona discharge preionization and high-speed replacement of the laser gas between two successive discharges which apparatus is particularly suited for sealed-off operation.

In Patent Application No. 48641A/82 filed in Italy on June 15, 1982 and corresponding to U.S. Pat. No. 4,546,482 by Selenia S.p.A., the inventors being Penco, Marchetti, Bagaglia, a method has been disclosed for providing a pulsed gas laser particularly suited for sealed-off operation wherein corona surface discharges are used for producing a preionization by UV radiation.

The apparatus of said application comprises a dielectric material tube within which the laser discharge electrodes are located facing each other. On the dielectric tube outher surface a metal layer is deposited or applied which is connected to one of the discharge electrodes.

By rapidly applying a pulsed electric field, corona surface discharges are produced on the inner surface of the dielectric tube whereby UV radiation is emitted which preionizes the gas between the electrodes.

By this way a laser has been obtained with good discharge stability while having simple and then low cost structure.

However the employment of the laser as above described suffers from the limitation that it cannot be operated as pulse-repetition frequencies higher than a few pulses per second.

In fact, as factually ascertained, a proper operation of a gas laser is achieved only when all the gas within the laser space is removed after each pulse discharge before supplying a fresh volume of gas into the laser space, the term fresh being used here to signify a gas mixture complying with the physical and chemical values as specified for the laser proper operation.

According to the present invention the means for replacing the used gas with a fresh one comprises an outer cylindrical shell wherein the laser active components are enclosed together with an inner cylindrical shell the axes of the two shells being parallel but not coincident whereby an eccentric sealed space is defined between them which communicates with the laser active space and wherein the units are received for circulating within said sealed space the exhausted gaseous mixture from the laser space and supplying it again into the same after restoring the theral and chemical characteristics of the mixture by means located within said eccentric space.

According to the above cited application the two main discharge electrodes are enclosed in a dielectric material tube which is heathed by a continuous wall of conducting material connected with one of the main discharge electrodes and more specifically with the so called "nonstressed" electrode.

On the other hand, according to the present application, the tube in which the electrodes are enclosed has a wide longitudinal aperture through which the "non-stressed" electrode unobstructedly faces the tube inside, two wide slits being left between each of the electrode longitudinal edges and the respective edge of the tube aperture for feeding the laser gas from said eccentric space into the laser space and for exhausting it again into the same eccentric space.

In order to not obstruct said slits the conducting layer of said application has been replaced according to this invention with a conductive grid.

Stable and homogeneous glow discharges can be obtained with this arrangement in spite of the wide longitudinal aperture of which the dieletrict tube defining the laser space is provided. This has been proven by factual tests carried out with lasers having the structure outlined above.

Basing on this ascertainment, a laser gas recycling circuit has been designed according to this invention whereby a sealed off operation of the laser can be effectively realized.

This invention will be better understood from the following description and attached drawings which illustrate a preferred embodiment thereof given by way of example.

Figure 1:
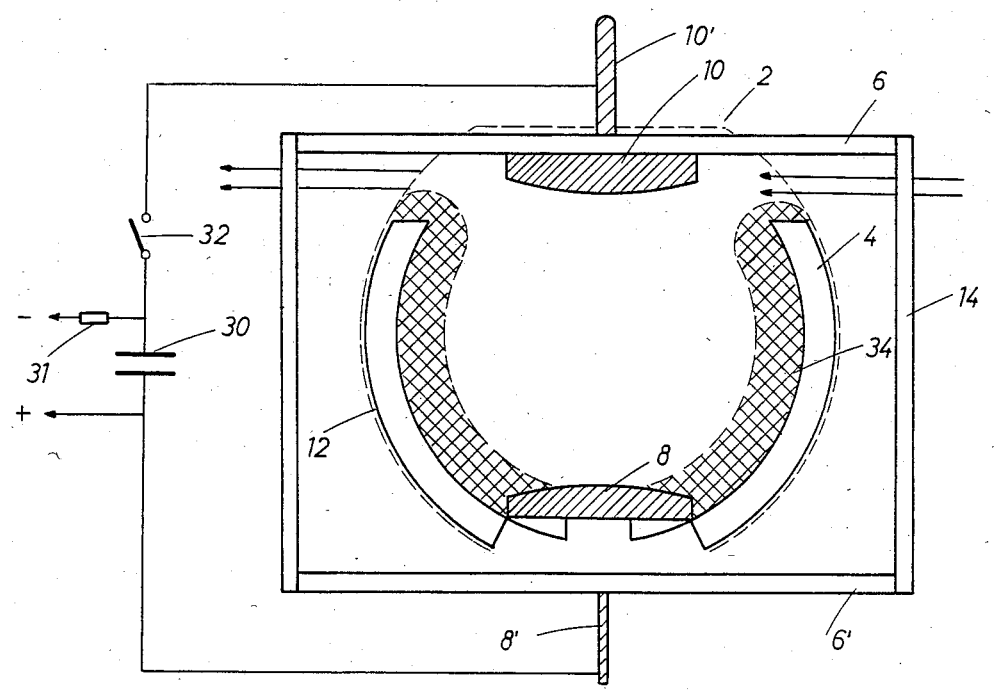
FIG. 1 shows a schematic view of the laser of this invention along with the related electric diagram.

With reference to the drawings the apparatus of this invention comprises a laser chamber 2 defined within a dielectric material cylindrical tube 4 a sector 16 of about 110–120 deg of the tube wall being lacking a channel shape being thus imparted to chamber 2, which tube is contained and supported in a hollow prismatic structure with rectangular cross-section the opposite upper 6 and lower 6' (in FIGS. 1, 2) walls being continuous while the other two 14,14' are limited to a short section from the respective ends of the prismatic structure to function as spacers for the other two walls; all of said walls being made of dielectric material.

The aperture 16 resulting from the lack of the 110–120 deg sector of the tube 4 wall is made to face the upper continuous wall 6 and the aperture edges are at a certain distance from the same wall whereby two slits are formed between said edges and wall.

Along the bottom of the channellike chamber 2 one of the two discharge electrodes, specifically the stressed electrode 8 extends which is energized through a lead 8' which crosses the continuous wall 6 at the centre of its surface. The non-stressed main electrode 10 is located in a diametrically opposed position in front of electrode 8 the distance between its active surface and the axis of tube 4 being greater than the distance of the plane containing the edges of channelike chamber 2 from the axis of tube 4. Electrode 10 is excited through a lead 10' which crosses wall 6 at the centre of its surface. Tube 4 is wrapped within a conducting grid 12 connected with the feeding lead 10' of electrode 10 which grid from lead 10' extends first over the continuous wall 6 at both sides of said lead and then crosses wall 6 and follows the outer surfaces of both sides of tube 4 to reach on them the longitudinal lines corresponding within tube 4 to the edges of electrode 8.

Figure 2:
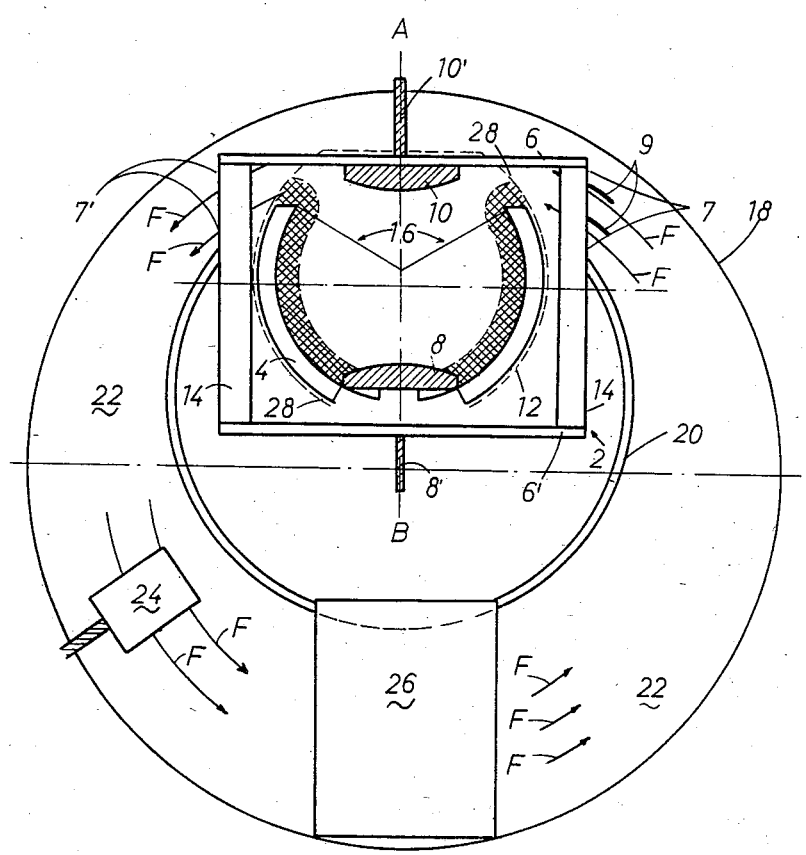
FIG. 2 shows a transverse cross section of the apparatus of this invention and the related gas recycling circuit.

The prismatic structure by which the laser chamber is supported is contained in a hollow fluidtight cylinder 18 of which it occupies about one half of its volume (the top half in FIGS. 1, 2). Within cylinder 18 a second cylinder 20 of smaller diameter is contained which is parallel but not coaxial thereto.

The diameters of cylinders 18 and 20 are substantially different (for instance, the smaller diameter can be about 0.6 the larger one with an eccentricity of about 1/10 of the larger diameter) whereby a space 22 is formed which has its maximum width at its section diametrically opposed to the section where the prismatic structure is located which contains and supports the laser chamber. Cylinder 20 is almost totally occupied by said structure which is fitted thereinto through a wide longitudinal aperture of the cylinder, the side edges of wall 6 of the structure being made to contact the inner surface of cylinder 18 whereby the gas flow in prevented from flowing over the outer surface of the same wall but is compelled to flow in and out of chamber 2 through symmetrical passages 7,7' between either edge of said cylinder aperture and said wall 6. Passages 7,7' can be provided with guide-vanes 9 for a smoother gas flow.

A cooling unit 24 and a turbo-fan unit 26 are received within space 22 for conditioning the gas flow and driving it in the direction of arrows F. The laser gaseous mixture is forced to enter the prismatic structure through said apertures 7,7' to reach the inside of channel 2 through grid 12 and to vortically swirl therein. In addition to cooling unit 24 and turbofan unit 26 other units can be housed within space 22 for restoring the laser gaseous mixture to the starting values of its chemico-physical characteristics.

Such additional units may comprise for instance absorbant beds adapted for absorbing those molecules produced by the laser discharges and liable to change the chemico-physical properties of the gaseous mixture or catalyst means adapted for recomposing those molecules which underwent dissociation due to the laser discharge.

In FIG. 1 the electric circuit diagram is shown of the apparatus. It comprises essentially a capacitor 30 across which the charging leads are connected through a power limiting resistor 31.

Capacitor 30 connects with electrodes 8 and 10 through a quick switch 32 of the "spark gap" or "thyratron" type the closing action of which is controlled by a pulse repetition frequency generator not shown.

OPERATION

By closing switch 32 the preionization of gas within the laser chamber is produced by a corona discharge as indicated by the cross hatching 34 of FIGS. 1,2. The gas between electrode 8,10 is preionized by the UV radiation produced by the corona discharge.

EXAMPLE

The apparatus of this invention has been operated by using a laser gas a $CO_2$ mixture with a repetition frequency greater than 100 pulses per second the peak power output being 1 MW (per pulse).

A pumping arc free volume density has been attained of 190 $Jl^{-1} atm^{-1}$ (the active volume being 9 $cm^3$) free from localized discharges.

The output volume density was 100 $MWl^{-1} atm^{-1}$ and the output efficiency was 7.5%.

We claim:

1. A pulsed gas laser with UV preionization by corona discharge including: a first electrode of a pair between which a laser discharge takes place, said first electrode being located in front of a longitudinal aperture having a wall of a C shaped channel of dielectric material with substantially constant thickness, said first electrode being located outside of said C shaped channel; a second electrode of said pair being located along the bottom of said channel; a conducting grid connected to said first electrode extending from said first electrode over both sides of said channel to a position at an edge of said second electrode at the inside of said channel; said laser having means for replacing, after each discharge the laser gas at least three times within the lapse of time between two successive laser discharges.

2. The laser apparatus as claimed in claim 1, including a prismatic hollow structure containing said C shaped channel along with the related conducting grid and the discharge electrodes, said prismatic hollow structure having a rectangular cross-section whose axis is parallel to the C shaped channel, two opposite continuous walls each made of a dielectric material and two other walls open except for a short section thereof near the structure ends; one of said continuous walls being located in front of said longitudinal aperture of the C channel at a short distance therefrom whereby a slit is formed between said wall and each of the C channel edges while the other continuous wall is tangent to the outer surface of the same channel; a first cylindrical gastight shell containing said hollow prismatic structure along with the components therein, said first electrode being located between the first of said continuous walls and said aperture of the C shaped channel.

3. The laser as claimed in claim 2, including a second cylindrical shell enclosed in said first cylindrical shell, the axes of said two cylindrical shells being parallel but not coincident whereby an eccentric space is defined between the interior of said first cylindrical shell and the exterior of said second cylindrical shell, said space being symmetrical with the symmetry plane of the laser, the minimum width of said space being at the position of said first electrode, said prismatic structure fitting almost totally into said second cylindrical shell through an aperture having the same size ss the width of said continuous walls of the structure; the two open sides of said structure protruding from the wall of said second cylinder a sufficient distance to define passages for reaching the inner surface of said second cylinder to enable the gas mixture to pass into and out of the laser chamber but not to flow over the surface of said continuous wall opposite to said aperture of the C channel; said means for replacing comprising a refrigerating unit and a turbofan positioned within said eccentric space for changing the gas in the laser chamber at least three times during the lapse of time between two successive discharges.

4. The laser apparatus as claimed in claim 3, including guide-vanes positioned on said structure to enable the gas mixture to get into and out of the laser chamber.

5. The laser apparatus as claimed in claim 3, including an absorber positioned within said eccentric space for absorbing those molecules which are liable to alter the composition of the laser gas mixture with respect to that specified for a proper operation of the laser.

6. The laser apparatus as claimed in claim 3, including a catalyzer positioned within said eccentric space for correcting the chemical characteristic of the gas exhausted from the laser chamber and restoring them to the standard mixture value.

* * * * *